June 7, 1966 M. COMANOR ET AL 3,255,048
SEA WATER BATTERY
Filed July 13, 1962 2 Sheets-Sheet 1

INVENTORS
MILTON COMANOR
MICHAEL ODLIVAK
BY
Irving Holtzman
ATTORNEY

June 7, 1966 M. COMANOR ET AL 3,255,048
SEA WATER BATTERY
Filed July 13, 1962 2 Sheets-Sheet 2

INVENTORS
MILTON COMANOR
MICHAEL ODLIVAK
BY
Irving Holtzman
ATTORNEY

United States Patent Office 3,255,048
Patented June 7, 1966

3,255,048
SEA WATER BATTERY
Milton Comanor, Queens, and Michael Odlivak, Monsey, N.Y., assignors to Yardney International Corp., New York, N.Y., a corporation of New York
Filed July 13, 1962, Ser. No. 209,640
5 Claims. (Cl. 136—100)

This invention relates to a water-activatable battery and, more particularly, to a battery which is activated by immersion in sea water or the like.

It has been suggested in the prior art to construct a so-called sea-water battery which comprises a plurality of cells each containing at least one electrochemical couple which is capable of functioning with sea water as the electrolyte. In one convenient struction of this type, a plurality of longitudinally extending compartments, hereinafter referred to as cell compartments, are provided in which are contained one or two electrochemical couples. In this construction, the individual cell compartment contains an inlet port in the floor of the compartment and an exit port in the roof of the compartment. When the device containing the battery is immersed in the sea, it is so designed that the whole battery is about a foot and a half below the surface of the water. Sea water then should continuously circulate through each cell compartment, entering the port at the bottom and leaving the port at the top.

The electrodes of the individual couples are maintained in spaced relationship by spacer means such as glass or plastic balls, buttons, etc. which are partially imbedded in one member of the couple. This provides a path between the plates through which the sea water may flow.

In some sea-water batteries, the electrode couples are horizontally disposed. However, the vertical disposition of the couples is advantageous in that the sludge which may form as a result of the electromechanical reactions involved is free to fall away from the electrodes under the influence of gravity.

In actual use, certain difficulties have been encountered in batteries of the character described above. One difficulty is the reduction in the capacity of the battery as a result of the impairment of circulation of sea water therethrough. A second difficulty is the loss of energy due to inter-cell current leakage. The latter is due to the conductive path formed by the sea water between cells.

It is an object of the present invention to provide a water-activatable battery wherein the likelihood of the interruption or diminution of the circulation of water therethrough is reduced to a minimum.

It is another object of this invention to provide a battery of the above described type wherein the loss of energy through inter-cell current leakage is also reduced to a minimum.

Other and more detailed objects will be apparent from the following description and drawing wherein.

Figure 1:
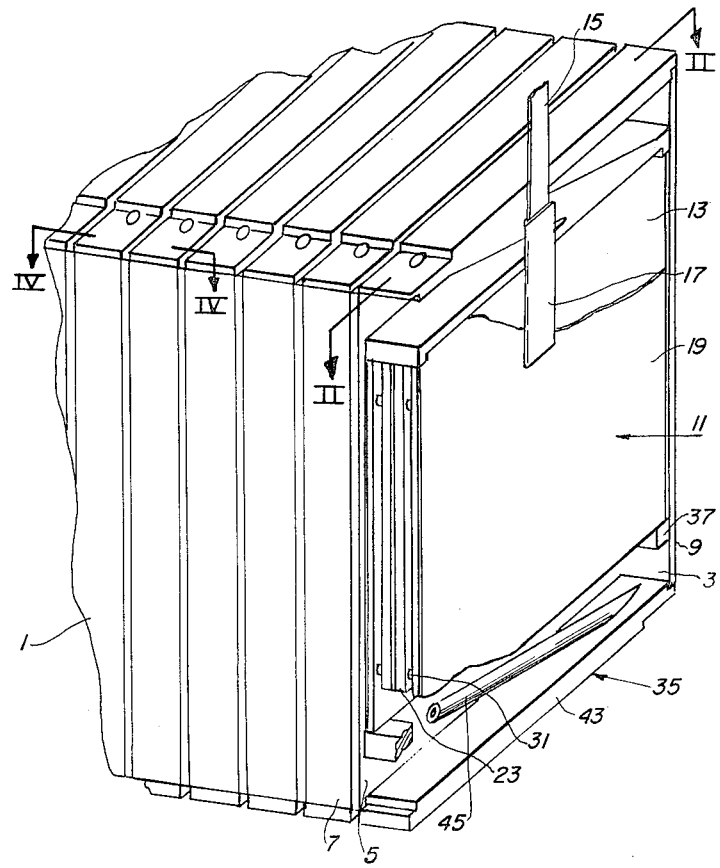
FIG. 1 is a partial perspective view of a battery embodied in the present invention, the battery casing being partly removed to show the details of the cell compartments.
Figure 2:
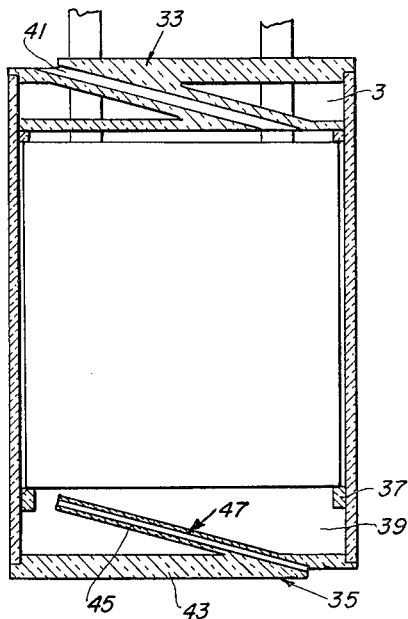
FIG. 2 is a cross-sectional view of FIG. 1 taken along line II—II thereof.
Figure 3:
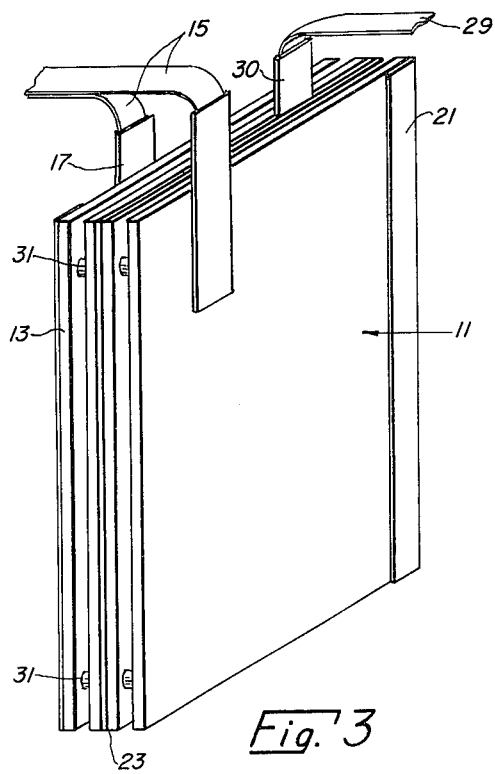
FIG. 3 is a perspective view of an electrode assembly which is contained in a single cell compartment of the battery shown in FIG. 1.

Referring to FIG. 1, the battery housing is shown at 1. Housing 1 is divided into individual cell compartments 3 by cell walls 5 which extend from the front wall 7 to the rear wall 9 of the battery housing 1.

Contained in each cell compartment is an electrode assembly 11 containing a pair of magnesium plates to which are welded silver foil tabs 15. Each tab is partially covered with a strip of insulating tape 17. The face of each magnesium plate 13 which is adjacent to a cell wall 5 or the end walls of the battery is covered with a thin protective film 19 which is resistant to the action of electrolyte. This serves to prevent the corrosion of the magnesium plate on the side thereof which is not contributing to the production of current. This may take the form of paint or a preformed film. In the embodiment shown, a transparent polyester tape was used.

One marginal border of the face of each magnesium plate 13, standing adjacent the cell walls 5 or the end walls of the battery, and adjacent the front or rear walls 7 and 9 respectively of the battery is also provided with a strip of insulating tape 21. The border of the magnesium plate 13 that is covered by said insulating tape is staggered so that on succeeding magnesium plates, tape 21 is adjacent the front wall 7 of the battery and on the next magnesium plate is adjacent the rear wall 9 of the battery.

Disposed between magnesium plates 13 is a silver chloride electrode member 23. This is composed of a pair of silver chloride plates 25 between which is sandwiched a sheet of thin silver foil 27. The silver foil 27 is preferably hot forged to the silver chloride plates 25 to make a unitary structure.

Each silver chloride electrode element 23 is also provided with a tab 29, preferably of silver foil, which is secured to said electrode element in any suitable manner. It may, for example, constitute a continuation of silver foil sheet 27 or may constitute a separate tab which is forged to the silver chloride electrode element 23. Tabs 29 are likewise partially covered with insulating tape 30 as illustrated in the drawings.

Partially imbedded in each silver chloride plate 25 are a plurality of spacer buttons 31 which serve to maintain the magnesium plates 13 separated from the faces of the silver chloride plates 25. Buttons 31 project outwardly from the face of the silver chloride plates and are distributed over their surface in such a manner as to maintain uniform separation of the plates and a clear path for the flow of sea water. In the modification of this invention illustrated in the drawing, 5 buttons are used in each silver chloride plate 25. One is disposed in each corner of this plate and one is positioned in the center of the plate.

The spacer buttons 31 may be made of any suitable inert material which will not be affected by the sea water or reaction products. These may be made of glass or synthetic resin (e.g. methyl methacrylate resin, polystyrene resin). These may be imbedded in the silver chloride plate 25 in any of several techniques which are well known to those skilled in this art.

To increase its conductivity, the silver chloride plate 25 is perforated with a multitude of small holes and the surface of this electrode is subjected to a developing procedure in a manner which is well known to those skilled in this art. A more conductive surface of metallic silver is thus provided.

Each electrode assembly 11 is placed into a cell compartment 3. Each cell compartment 3 is provided with a top closure member 33 and a bottom closure member 35. The cell compartment 3 is larger than the electrode assembly 11. The latter are spaced from the bottom closure member 35 and are maintained in this position by support members 37 which are secured to the front and rear walls of each cell compartment 3. This forms a sludge reservoir 39 at the bottom of each compartment whose function will be described in more detail below.

Top closure member 33 is equipped with an outlet conduit 41 which takes the form of a long bore drilled through said member. In cross-section, top closure member 33 approximate a "Z." The bore of the conduit 41 extends approximately the whole length of the diagonal of this "Z."

The outlet conduit 41 is disposed so that it is at an angle with respect to the horizontal axis of the cell compartment 3. Optimum performance is obtained when this angle is between about 15° and 90°.

The bottom closure member 35 consists of a base 43 and a long hollow tubular member 45. The latter constitutes the inlet conduit 47 of the cell compartment. In cross-section, the reservoir 39 appears approximately a rectangle. The inlet conduit 47 extends approximately the whole length of the diagonal of this rectangle. The inlet conduit 47 is also disposed so that it is an angle with regard to the horizontal axis of the cell compartment 3. Again optimum performance is obtained when this angle is between about 15° and 90°. The outlet opening of conduit 47 is thus disposed above the bottom of the reservoir in the space defined by the bottom and walls.

The construction of the closure members described above, and the provision of the reservoir 39 have several advantages. As previously mentioned, one of the drawbacks of batteries of this character is the inter-cell current leakage which results in the loss of energy. The provision in the construction of the present invention for long tubular conduits which serve as inlet and outlet conduits for the sea water present a long path of high electrical resistance that the leakage current must travel from cell to cell. As a result of this, the leakage current is very much reduced.

In the operation of batteries of the type to which the present invention pertains, gas is generated in the battery which must be vented. Furthermore, sludge develops between the electrode plates which must be removed if sea water is to continue to circulate through the battery.

It has been found that by utilizing an exit conduit which is disposed at an angle with respect to the horizontal axis of the cell compartment (preferably 15°), that the flow of gas out of the battery was greatly facilitated. When compared with a system that utilizes a horizontally disposed outlet conduit provided with a terminal portion that is at right angles to the main horizontal portion of the conduit, that the rate of gas escape in the present invention was 10 times as great. Small gas bubbles rose rapidly to the top of the tube and passed out of the conduit disposed at an angle in accordance with this invention. The small gas bubbles did not have to accumulate and form larger bubbles of greater pressure before they would be vented as is characterisstic of the horizontal conduit system described above. This enhanced the outflow of sea water tremendously resulting in excellent irrigation of the cells.

With regard to the sludge that develops during the electrochemical reaction, this under ordinary circumstances would tend to clog the space between the electrode and thus cut down on the irrigation therebetween. Sludge that develops in the batteries of this invention falls to the bottom of the cell and into the reservoir 39 that is provided for this purpose. The sludge is thus out of the path of the incoming sea water. If some sludge does enter inlet conduit 45, it moves down along the lower section thereof when viewed in cross-section. This permits the sea water to enter through the upper half of the conduit and thus pass counter-current to the outflowing sludge.

Figure 4:
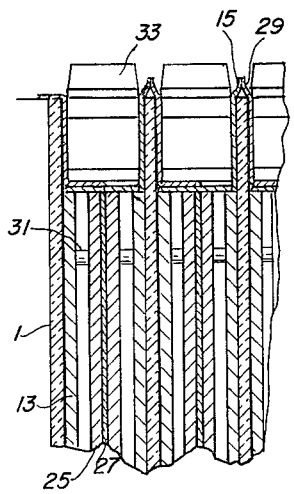
FIG. 4 is a partial sectional view taken along IV—IV of the battery shown in FIG. 1 illustrating the manner in which the cells of the battery are connected in series.

The cells in adjacent cell compartments are connected in series. This is accomplished by electrically connecting the two tabs of the magnesium plates in one cell compartment with the tab of the silver chloride electrode assembly of the adjacent cell. These are brought up in the space between the walls of the cell compartment and the sides of the top closure. This is best seen in FIG. 4. The remaining tabs in the end cells are connected to the battery terminals.

FIGS. 5 through 8 illustrate the top and bottom closures of another embodiment of this invention. This embodiment is otherwise identical with the modification shown in FIGS. 1 through 4.

Figure 5:
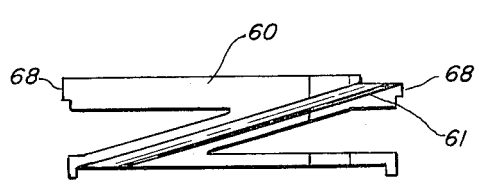
FIG. 5 is a side elevation of a top closure member of another embodiment of this invention.
Figure 6:
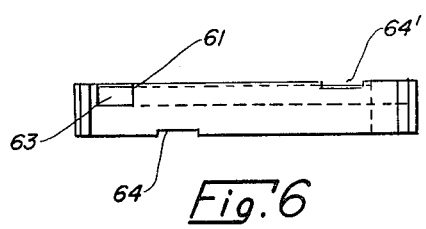
FIG. 6 is a top plan view of the closure member shown in FIG. 5.
Figure 7:
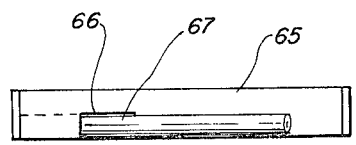
FIG. 7 is a top plan view of a bottom closure member of another embodiment of the present invention.
Figure 8:
FIG. 8 is a side elevation of the bottom closure member shown in FIG. 7.

As shown in FIGS. 5 and 6, the top closure member 60 is provided with a diagonal slot 61 which is cut in one side face of closure member 60. A hollow tube 63 is inserted in slot 61 and serves as an outlet passage for the sea water. Slots 64 and 64' are also cut in side faces of top closure member 60 so as to provide a space through which the battery tabs may pass in connecting the cells in series as described above. These slots may vary in position depending on the location of the cell in the battery.

The top closure member 60 is shown as being Z shape in profile. However, it may also take the form of a rectangular parallelepiped. In all instances, however, the tube 63 is at an angle with regard to the horizontal and preferably an angle between about 15° and 90°.

The bottom closure member 65 is formed in a similar manner in that it is provided with a slot 66 in a side face thereof. A hollow tubular member 67 is inserted in slot 66 and serves as an inlet for the sea water. Tubular member 67 is likewise preferably at an angle of about 15° with respect to the horizontal.

The tubular members 63 and 67 are maintained in position in any suitable fashion. They may rely on the friction between the walls of the slots in which they lie and the cell walls or they may be cemented to the walls of said slots. As in the previous modification, the closure members may be provided with flanges 68 and 69 respectively which serve as seats for the closure on the battery case.

Although this invention has been described with regard to a silver chloride-magnesium system, it obviously has application to other systems. Thus, for example, it may be utilized in connection with a magnesium-cuprous chloride system. Furthermore, it also has application to those systems which use fresh water instead of sea water or any other system in which the battery is immersed in a liquid to activate it.

Whereas the invention has been described with reference to specific forms thereof, it will be understood that many changes and modifications may be made without departing from the spirit of this invention.

What is claimed is:

1. In a sea water battery activated by a moving stream of electrolyte, in combination, at least one cell casing defining an electrode compartment and a sludge reservoir below said compartment; at least one pair of oppositely poled electrodes spacedly juxtaposed in said compartment for permitting the passage of electrolyte whereby sludge from said electrodes falls into said reservoir; inlet means in one side of said casing for admitting said stream of electrolyte into said compartment, said inlet means including a first elongated conduit extending inclinedly inwardly into said compartment through said reservoir and communicating with said compartment at one end of said first conduit above the bottom of said reservoir while having a mouth at its other end opening externally of said casing; and outlet means in a side of said casing remote from said inlet means for conducting expended electrolyte away from said electrodes.

2. In a sea water battery activated by a moving stream of electrolyte, in combination, at least one cell casing defining an electrode compartment and a sludge reservoir below said compartment; at least one pair of upright generally flat, oppositely poled, substantially vertical electrodes spacedly juxtaposed in said compartment for permitting the passage of electrolyte generally upwardly therebetween whereby sludge from said electrodes falls into said reservoir; inlet means in a lower side of said casing for admitting said stream of electrolyte into said compartment, said inlet means including a first elongated conduit extending inclinedly inwardly and upwardly to the horizontal into said compartment through said reservoir and communicating with said compartment at one end of said first conduit above the bottom of said reservoir while having a mouth at its other end opening externally of said casing; and outlet means at an upper side of said casing for conducting expended electrolyte away from said electrodes.

3. In a sea water battery activated by a moving stream of electrolyte, in combination, at least one cell casing defining an electrode compartment and a sludge reservoir below said compartment; at least one pair of oppositely poled electrodes spacedly juxtaposed in said compartment for permitting the passage of electrolyte whereby sludge from said electrodes falls into said reservoir; inlet means in one side of said casing for admitting said stream of electrolyte into said compartment, said inlet means including a first elongated conduit extending inclinedly inwardly into said compartment through said reservoir and communicating with said compartment at one end of said first conduit above the bottom of said reservoir while having a mouth at its other end opening externally of said casing; and outlet means in a side of said casing remote from said inlet means for conducting expended electrolyte away from said electrodes, said outlet means including a second elongated conduit extending inclinedly outwardly from said compartment with a direction of inclination similar to that of said first conduit.

4. In a sea water battery activated by a moving stream of electrolyte, in combination, at least one cell casing defining an electrode compartment and a sludge reservoir below said compartment; at least one pair of upright generally flat, oppositely poled, substantially vertical electrodes spacedly juxtaposed in said compartment for permitting the passage of electrolyte generally upwardly therebetween whereby sludge from said electrodes falls into said reservoir; inlet means in a lower side of said casing for admitting said stream of electrolyte into said compartment, said inlet means including a first elongated conduit extending inclinedly inwardly and upwardly to the horizontal into said compartment through said reservoir and communicating with said compartment at one end of said first conduit above the bottom of said reservoir while having a mouth at its other end opening externally of said casing; and outlet means at an upper side of said casing for conducting expended electrolyte away from said electrodes, said outlet means including a second elongated conduit extending inclinedly outwardly and upwardly to the horizontal from said compartment with a direction of inclination similar to that of said first conduit, said conduits lying in planes parallel to said electrodes.

5. In a sea water battery activated by a moving stream of electrolyte, in combination, at least one cell casing defining an electrode compartment and a sludge reservoir below said compartment; at least one pair of upright, generally flat, substantially vertical magnesium and silver chloride electrodes spacedly juxtaposed in said compartment for permitting the passage of electrolyte generally upwardly therebetween whereby sludge from said electrodes falls into said reservoir; inlet means in a lower side of said casing for admitting said stream of electrolyte into said compartment, said inlet means including a first elongated conduit extending inclinedly inwardly and upwardly to the horizontal into said compartment through said reservoir and communicating with said compartment at one end of said first conduit above the bottom of said reservoir while having a mouth at its other end opening externally of said casing; and outlet means at an upper side of said casing for conducting expended electrolyte away from said electrodes, said outlet means including a second elongated conduit extending inclinedly outwardly and upwardly to the horizontal from said compartment with a direction of inclination similar to that of said first conduit, said conduits lying in planes parallel to said electrodes.

References Cited by the Examiner

UNITED STATES PATENTS

| 2,474,716 | 6/1949 | Beechlyn | 136—100 |
| 2,988,587 | 6/1961 | Haring | 136—103 |
| 3,005,864 | 10/1961 | Sharpe | 136—100 |

FOREIGN PATENTS

| 68,023 | 6/1947 | Norway. |

ALLEN B. CURTIS, *Primary Examiner.*

JOHN H. MACK, *Examiner.*